United States Patent
Haering et al.

(10) Patent No.: US 8,186,711 B2
(45) Date of Patent: May 29, 2012

(54) SEPARATION OF ABUSE CONDITIONS AND CRASH EVENTS TO CONTROL OCCUPANT RESTRAINT DEVICES

(75) Inventors: Juergen Haering, Stuttgart (DE); Frank-Juergen Stuetzler, South Lyon, MI (US)

(73) Assignee: Robert Bosch GmbH, Stuttgart (DE)

( * ) Notice: Subject to any disclaimer, the term of this patent is extended or adjusted under 35 U.S.C. 154(b) by 2219 days.

(21) Appl. No.: 10/919,651

(22) Filed: Aug. 17, 2004

(65) Prior Publication Data
US 2006/0038387 A1   Feb. 23, 2006

(51) Int. Cl.
*B60R 21/16* (2006.01)

(52) U.S. Cl. ........................................... 280/734

(58) Field of Classification Search ................ 280/734, 280/735; 701/45
See application file for complete search history.

(56) References Cited

U.S. PATENT DOCUMENTS

| | | |
|---|---|---|
| 3,911,391 A | 10/1975 | Held et al. |
| 4,638,179 A | 1/1987 | Mattes et al. |
| 5,339,242 A | 8/1994 | Reid et al. |
| 5,418,722 A | 5/1995 | Cashler |
| 5,436,838 A | 7/1995 | Miyamori |
| 5,483,449 A | 1/1996 | Caruso et al. |
| 5,608,628 A | 3/1997 | Drexler et al. |
| 5,668,740 A | 9/1997 | Wang et al. |
| 5,964,817 A | 10/1999 | Dalum et al. |
| 5,969,599 A | 10/1999 | Wessels et al. |
| 5,978,722 A | 11/1999 | Takasuka et al. |
| 6,070,113 A | 5/2000 | White et al. |
| 6,154,698 A | 11/2000 | Walden et al. |
| 6,157,880 A | 12/2000 | de Mersseman et al. |
| 6,170,864 B1 | 1/2001 | Fujita et al. |
| 6,198,387 B1 | 3/2001 | Dalum et al. |
| 6,305,709 B1 | 10/2001 | Okada |
| 6,330,500 B1 | 12/2001 | Moriyama et al. |
| 6,439,007 B1 | 8/2002 | Foo et al. |
| 6,529,810 B2 | 3/2003 | Foo et al. |
| 6,553,294 B1 | 4/2003 | Caruso et al. |
| 2002/0147533 A1 | 10/2002 | Foo et al. |
| 2003/0173827 A1 | 9/2003 | Bentele-Calvor et al. |
| 2004/0088094 A1 | 5/2004 | Kleinschmidt et al. |
| 2006/0113778 A1 | 6/2006 | Seikai |

FOREIGN PATENT DOCUMENTS

| | | |
|---|---|---|
| DE | 4223562 A1 | 9/1993 |
| DE | 10050956 A1 | 5/2002 |
| JP | S47-25568 | 10/1972 |
| JP | H4-317837 | 9/1992 |
| WO | WO 02/28688 | 4/2002 |

OTHER PUBLICATIONS

Excerpt from Japanese Office Action dated Jan. 13, 2011, Japanese Patent Application No. 2005-235791.

*Primary Examiner* — Faye M. Fleming
(74) *Attorney, Agent, or Firm* — Michael Best & Friedrich LLP

(57) ABSTRACT

A method of controlling a restraint device in a vehicle. The method comprises sensing an acceleration of the vehicle, analyzing the acceleration with at least two independent thresholds, and activating the restraint device when the analyzed acceleration exceeds the at least two independent thresholds.

26 Claims, 4 Drawing Sheets

SEPARATION OF ABUSE CONDITIONS AND CRASH EVENTS TO CONTROL OCCUPANT RESTRAINT DEVICES

BACKGROUND

Embodiments of the invention relate to vehicle control systems, and more particularly to a vehicle control system to deploy an occupant restraint device.

Restraint devices such as airbags and seatbelts are, in general, actuated during crashes or possible crashes to protect vehicle occupants from injury. The accuracy and timeliness of deployment and actuation are factors in the effectiveness of restraint devices.

Some restraint devices are controlled using algorithms that process accelerations measured in various locations of a motor vehicle. The measured accelerations are analyzed using various functions such as integration (to yield velocity), a sum of squares of the measured accelerations, slopes of the measured accelerations, and the like. The outputs of the functions are compared to thresholds that may be constant, depending on factors such as time or physical properties like relative velocity. If the thresholds are crossed, restraint devices are deployed.

SUMMARY

A variety of vehicle conditions may be considered when controlling vehicle restraint devices. A "crash" condition (or "deployment crash" condition) exists when a vehicle has experienced an impact or collision above a certain threshold. In a "crash" condition the vehicle experiences forces that warrant the activation of a restraint device. Another type of condition is an "abuse" condition. An "abuse" condition may exist for a variety of reasons. For example, jarring of the vehicle as the vehicle travels over rough roads may cause an abuse condition to exist. Generally, the existence of an abuse condition does not warrant the activation of a restraint device. Yet another type of condition is sometimes referred to as a "no-deployment-crash" condition. In such a condition, the vehicle may have experienced an impact or collision, but the magnitude of the impact or collision is not sufficient to warrant the deployment of an occupant restraint device.

The inventors have discovered that one deficiency of known technologies is that crash conditions and abuse conditions are often treated the same way. For example, some algorithms tune thresholds used in them such that neither no-deployment-crashes nor abuse conditions will cross any of the thresholds. (In a no-deployment-crash, the restraint device should not been deployed.) As a result, abuse conditions can adversely impact deployment time during crashes. That is, both abuse and crash conditions are compared to the same thresholds. In such a case, the restraint devices may be deployed when the vehicle is simply experiencing abuse conditions. Or, the restraint devices may be disabled even when the vehicle is experiencing a crash condition because of the inaccuracy of the combined thresholds.

In one embodiment, the invention provides a method of controlling a restraint device in a vehicle. The method includes determining a vehicle condition that has a value, and retrieving an abuse condition threshold and a deployment condition threshold based on the value of the determined condition. The method then includes generating a restraint device activation signal when the value of the determined condition is below the abuse condition threshold and above the deployment condition threshold.

Another embodiment of the invention provides a method of controlling a restraint device in a vehicle. The method includes sensing an acceleration of the vehicle, determining a vehicle signal based on the acceleration, and retrieving an abuse condition threshold and a deployment condition threshold based on the acceleration and the vehicle signal. The method also includes comparing a value of the vehicle signal with the abuse condition threshold and the deployment condition threshold, and generating an activation signal based on the comparison.

Another embodiment provides a method of controlling a restraint device that includes sensing an acceleration of a vehicle, analyzing the acceleration with at least two independent thresholds, and activating the restraint device when the analyzed acceleration exceeds the at least two independent thresholds.

Yet another embodiment provides an apparatus for controlling a restraint device in a vehicle. The apparatus includes a sensor configured to sense a vehicle condition having values that are indicative of vehicle accelerations. The apparatus also includes a comparator that compares the value with at least two independent thresholds to produce a comparator output, and a signal generator coupled to the comparator. The signal generator generates a deployment signal when the comparator output exceeds the at least two independent thresholds.

Still another embodiment provides a vehicle. The vehicle includes a restraint device, a sensor to sense a plurality of values indicative of vehicle accelerations, and a processing unit to compare the values indicative of vehicle accelerations with an abuse condition threshold and an independent deployment condition threshold. The processing unit generates a deployment signal when the value is below the abuse condition threshold and above the deployment condition threshold. The vehicle also includes a restraint device that can be deployed upon receiving the deployment signal.

Other features and advantages of embodiments will become apparent to those skilled in the art upon review of the following detailed description, claims, and drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

Figure 1:
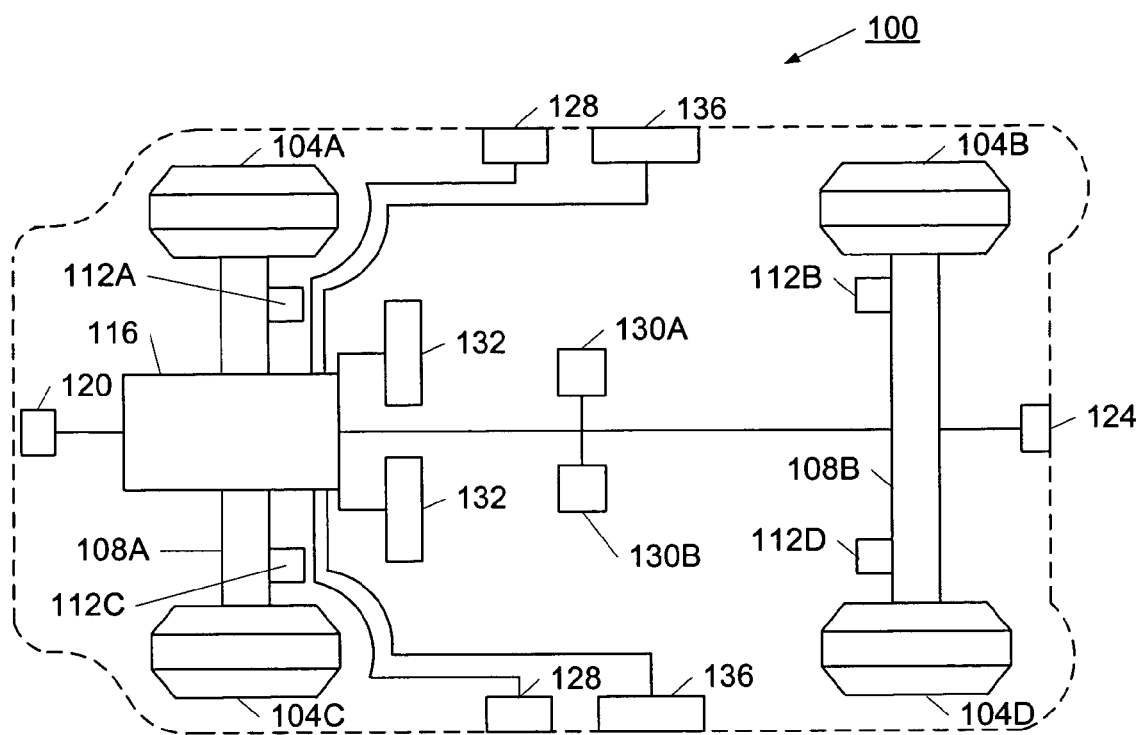
FIG. 1 shows a schematic plan view of a vehicle.

FIG. 1 shows a schematic plan view of an exemplary vehicle 100. The vehicle 100 has four wheels 104A, 104B, 104C and 104D. The wheels 104A, 104B, 104C and 104D are connected to two axles 108A and 108B, as shown. The four wheels are monitored by a plurality of wheel speed sensors 112A, 112B, 112C and 112D. The wheel speed sensors 112A, 112B, 112C, and 112D are coupled to an electronic processing unit ("ECU") 116. The vehicle 100 also includes other sensors such as a front bumper sensor 120, a back bumper sensor 124, a plurality of side impact sensors 128, and accelerometers or acceleration sensors 130A and 130B. The wheel speed sensors 112A, 112B, 112C and 112D, the front bumper sensor 120, the back bumper sensor 124, the plurality of side impact sensors 128, and the sensors 130A and 130B are shown as individual sensors generically. These sensors 112A, 112B, 112C, 112D, 120, 124, 128, 130A, and 130B can also include multiple sensors in a plurality of sensor arrays that may be coupled to the ECU 116. Other types of sensors such as thermal sensors can also be used in the vehicle 100.

The vehicle 100 also includes a plurality of restraint devices such as front airbags 132 and side airbags 136. Although FIG. 1 shows only airbag restraint devices, other types of restraint devices such as seatbelt tensioners, and head and torso airbags can also be used in the vehicle 100.

Figure 2:
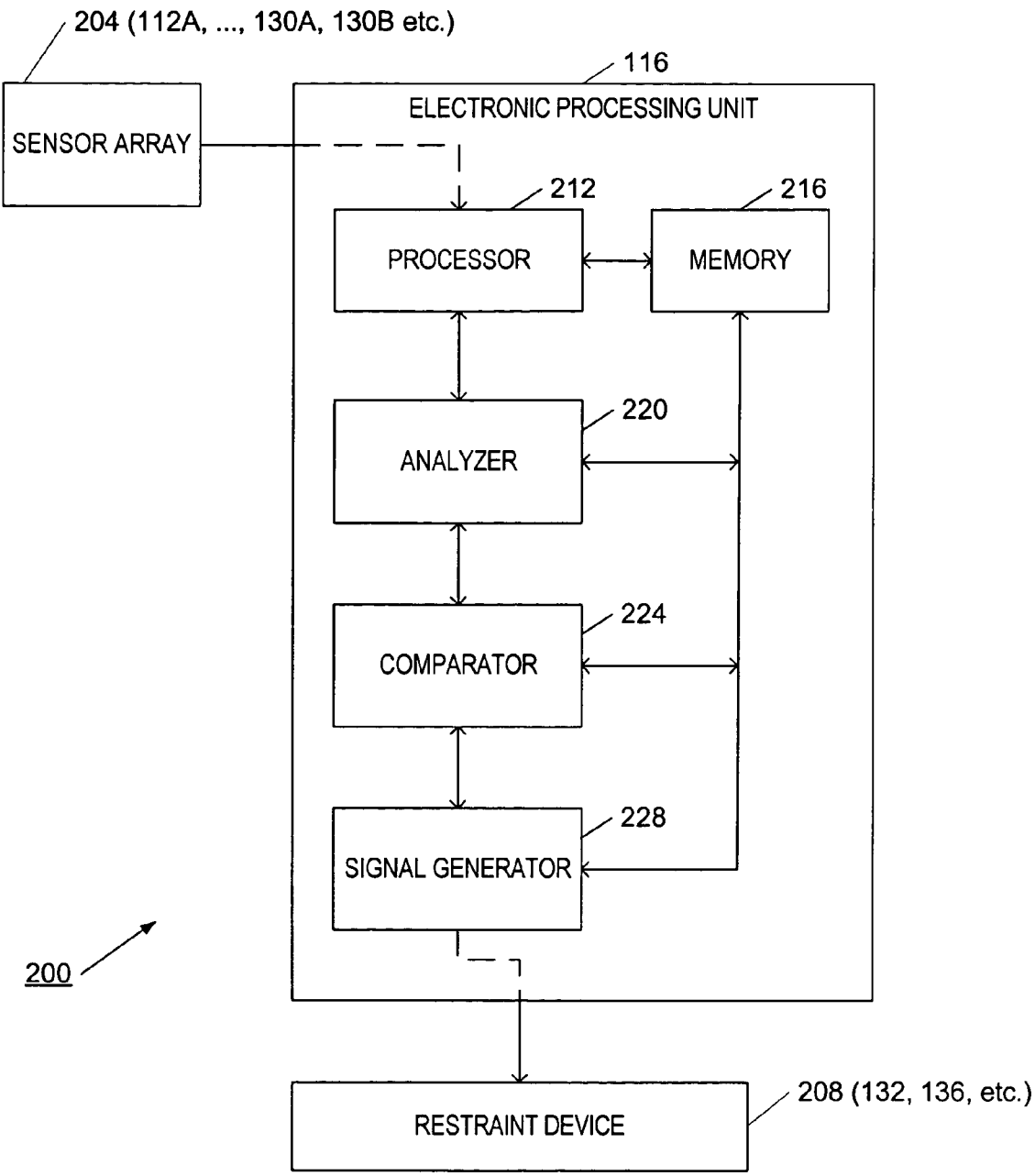
FIG. 2 shows a block diagram of a control system in the vehicle in FIG. 1.

In one embodiment, a control system 200 (FIG. 2) is used to separate non-deployment crash conditions from deployment crash conditions. The control system 200 receives its input from a sensor array 204 that includes the wheel speed sensors 112A, 112B, 112C, and 112D, the front bumper sensor 120, the back bumper sensor 124, the side impact sensors 128, and the sensors 130A and 130B. FIG. 2 also shows the ECU 116 in block diagram format. Once the outputs from the sensor array 204 have been processed by the ECU 116, a restraint device 208 can be deployed.

In one embodiment, each of the sensors 130A and 130B detects and monitors a specific condition of the vehicle 100. For example, the sensors 130A and 130B are used to sense a condition of the vehicle that is indicative of an amount of acceleration experienced by the vehicle 100. In some embodiments, the sensors 130A and 130B sense motion of the vehicle 100. Sensed motions are then transduced and converted into signals that are indicative of acceleration of the vehicle 100. If the sensors 130A and 130B are equipped with any calibration circuitry or microprocessor therein, the motions can be calibrated internally in the sensors 130A and 130B. Otherwise, the signals can be converted into calibrated signals by other external processes in a manner known in the art. Furthermore, other sensors such as the front bumper sensor 120, the back bumper sensor 124, the side-impact sensors 128 can be used to detect or sense events such as crashes and collisions. Values of the signals output by the sensors 112A, 112B, 112C, 112D, 120, 124, 128, 130A, 130B, or by the sensor array 204 are referred to as sensed values, or values hereinafter.

The ECU 116 includes a processor 212 that receives the values from the sensor array 204. The processor 212 then processes the values according to a program stored in a memory 216. Although the memory 216 is shown as being external to the processor 212, the memory 216 can also be internal to the processor 212. Furthermore, the processor 212 can be a general-purpose micro-controller, a general-purpose microprocessor, a dedicated microprocessor or controller, a signal processor, an application-specific-integrated circuit ("ASIC"), or the like. In some embodiments, the control system 200 and its functions described are implemented in a combination of firmware, software, hardware, and the like. To be more specific, as illustrated in FIG. 2, the processor 212 communicates with other modules (discussed below). The modules are illustrated as if they were implemented in hardware. However, the functionality of these modules could be implemented in software, and that software could, for example, be stored in the memory 216 and executed by the processor 212.

The exemplary ECU 116 includes an analyzer 220 that converts, filters or transforms the values generated by the sensor array 204 from one form to another depending on the application at hand. For example, when the values generated by the sensor array 204 are indicative of an acceleration of the vehicle 100, the analyzer 220 converts the acceleration value to values such as transformed acceleration. For another example, the analyzer 220 can filter the accelerations into filtered accelerations that may be indicative of a relative velocity of the vehicle 100. For yet another example, the analyzer 220 can transform the accelerations into a value that is indicative of energy dissipated in the vehicle 100 during the crash. Other transformed values include relative distance displacement, quantized acceleration, absolute-valued acceleration, filtered acceleration, and the like. In some embodiments, the relative velocity of the vehicle is typically determined or obtained by integrating the acceleration detected. Although the analyzer 220 is shown being external to the processor 212, the analyzer 220 can also be internal as a software or hardware module of the processor 212.

Once the values from the sensor array 204 have been analyzed in the analyzer 220, either one or both of the analyzed values and the unanalyzed values are used to retrieve thresholds stored in the memory 216. For example, when the unanalyzed values and the analyzed values represent acceleration and velocity respectively, the acceleration and velocity are then used to retrieve a no-abuse condition threshold (or an abuse condition threshold that is similar in nature), and a deployment threshold, detailed hereinafter.

Referring back to FIG. 2, the ECU 116 also includes a comparator 224 that compares the unanalyzed value with a no-abuse threshold 312 (FIG. 3A) retrieved from the memory 216 based on the analyzed value with a deployment condition threshold 362 (FIG. 3B) retrieved from the memory 216 also based on the analyzed value, as discussed earlier. The outputs of these comparisons are fed to a signal generator 228. The outputs of the comparisons are further compared. When the unanalyzed value corresponding to the analyzed value is above the no-abuse threshold 312 and above the deployment condition threshold 362, the signal generator 228 generates a deployment signal to activate the restraint device 208. Otherwise, when the unanalyzed value corresponding to the analyzed value is either below the no-abuse threshold 312 or below the deployment condition threshold 362, the signal generator 228 generates a disabling signal that disables the restraint device 208.

In some embodiments, the signal generator 228 will only generate an activating signal or deployment signal when the unanalyzed value is above both retrieved thresholds, and will not generate any disabling signal otherwise. In this way, other deployment techniques can also be used to activate the restraint devices. For example, in yet some other embodiments, the signal generator 228 can also generate the activating signal or deployment signal based on a combination of signals generated by other deployment algorithms and the outputs of the comparator 224. That is, signals from additional deployment techniques are combined and processed in the signal generator 228 to arrive at a final deployment decision.

Figure 3A:
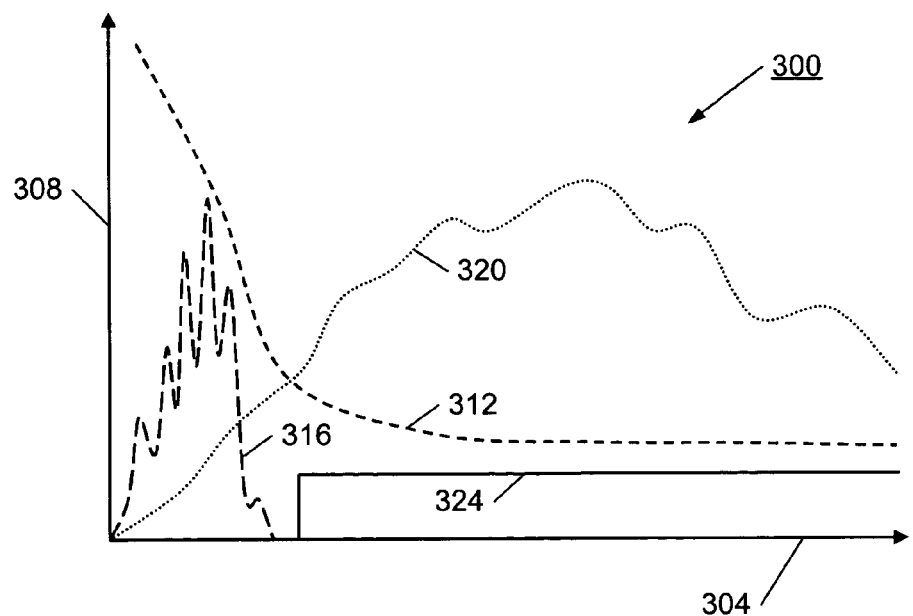
FIG. 3A is a graph of an abuse condition threshold.

In general, the no-abuse condition threshold separates an abuse condition that does not require a restraint device deployment from a no-abuse condition that may require the deployment of a restraint device. FIG. 3A shows a no-abuse condition threshold plot 300. The analyzed values such as the relative velocities are measured along an x-axis 304 and the unanalyzed values such as the accelerations are measured along a y-axis 308. No-abuse threshold curve 312 generally separates an abuse condition curve 316 from a no-abuse crash condition 320. The abuse condition curve 316 typically has high oscillatory acceleration peaks. Therefore, the magnitude of the relative velocity is relatively low. The no-abuse crash condition curve 320 typically has no or minimal oscillatory acceleration which results in a relative velocity even for small collision speeds. The no-abuse crash condition 320 therefore crosses the decreasing no-abuse threshold curve 312 while the abuse condition curve 316 does not. If the no-abuse threshold curve is crossed, a no-abuse flag is set. The no-abuse flag is represented by a no-abuse step function 324 in FIG. 3A. During vehicle operation, an acceleration (or deceleration) is detected. A relative velocity is thereafter obtained from the detected acceleration, in a manner that is detailed hereinafter. If the detected acceleration corresponding to the relative velocity is above the no-abuse threshold curve 312, the no-abuse condition is recognized, and the no-abuse flag is set. In general, the no-abuse threshold curve 312 is dynamically determined or measured from the analyzed values sensed over different times, the analyzed values generated from the unanalyzed values, and the like. For example, a first analyzed value can be obtained from determining a plurality of unanalyzed values over a first period of time, while a second analyzed value can be obtained from the unanalyzed values over a second period of time. In this way, the analyzed values determined from the two unanalyzed values can be different, thereby yielding different thresholds.

Figure 3B:
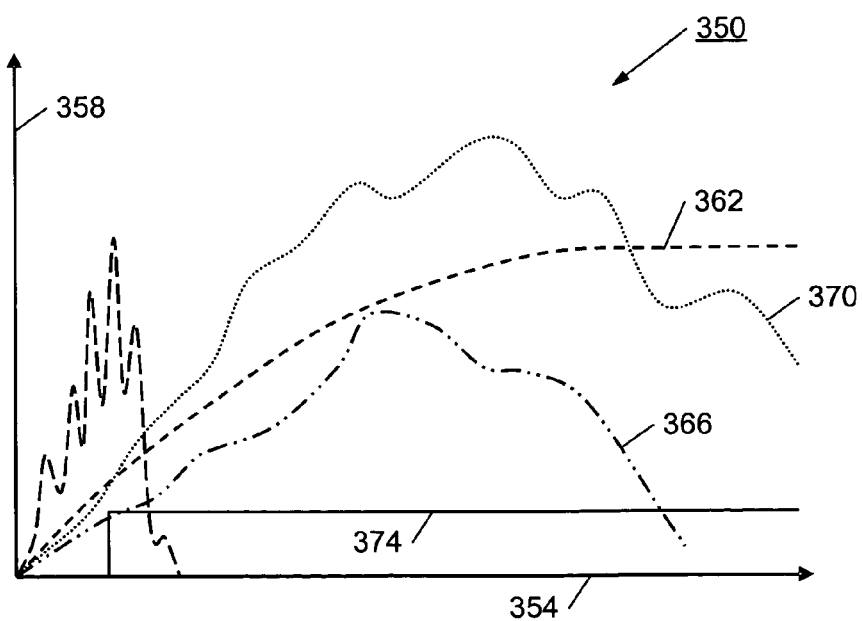
FIG. 3B a graph of a deployment condition threshold.

Similarly, FIG. 3B shows a deployment condition threshold plot 350. The analyzed values such as the relative velocities are measured along a second x-axis 354, and the unanalyzed values such as the accelerations are measured along a second y-axis 358. An increasing deployment threshold curve 362 separates a non-deployment crash curve 366 from a deployment crash curve 370. If a crash occurs, a crash acceleration (or deceleration) is detected. A relative velocity is obtained from the detected acceleration, detailed hereinafter. If the detected acceleration corresponding to the relative velocity is above the deployment threshold curve 362, a deployment condition is recognized, and a deployment flag is set. The deployment flag is represented by a deployment step function 374 in FIG. 3B. Furthermore, since the two thresholds 312 and 362 are independent on each other, even when the abuse condition curve 316 crosses the deployment threshold curve, the deployment flag 374 is not set, because the abuse conditions will be correctly identified by the no-abuse threshold plot 300 as an abuse condition. Similar to the no-abuse threshold curve 312, the deployment threshold curve 362 is dynamically determined or measured from the unanalyzed values sensed over different times, the analyzed values generated from the unanalyzed values, and the like.

Various unanalyzed values and analyzed values can be used in establishing the thresholds 312 and 362. For example, the relative velocity as determined by integrating the detected acceleration can be plotted against the detected acceleration as the control value with the thresholds then based on the filtered acceleration. Similarly, the filtered acceleration can be plotted against the relative velocity as a control value, with the thresholds based on the relative velocity, as illustrated in FIG. 3A and FIG. 3B. As another example, the relative velocity or the filtered acceleration can be plotted against a crash time (measured from the beginning of the crash to the end of the crash) as a control value with the thresholds based on the crash time. Other examples for the unanalyzed and analyzed values include the relative displacement as determined by double integration of the measured acceleration. The displacement can also be plotted against the filtered acceleration or the relative velocity as control values.

It is also possible to use different unanalyzed and analyzed values in the no-abuse condition threshold 312 and the deployment condition threshold 362. An example can be a filtered acceleration, in which the acceleration is filtered with different filter frequencies for use in the no-abuse condition threshold 312 and the deployment condition threshold 362. Features or values specifically suitable and/or tuned to separate abuse conditions from crash conditions regardless of their severity may also be employed in the no-abuse condition threshold 312. Similarly, different unanalyzed and analyzed values suitable to identify the severity of crashes and to separate non-deployment crashes from deployment crashes regardless of the abuse conditions can also be used to establish the deployment condition threshold 362.

Figure 4:
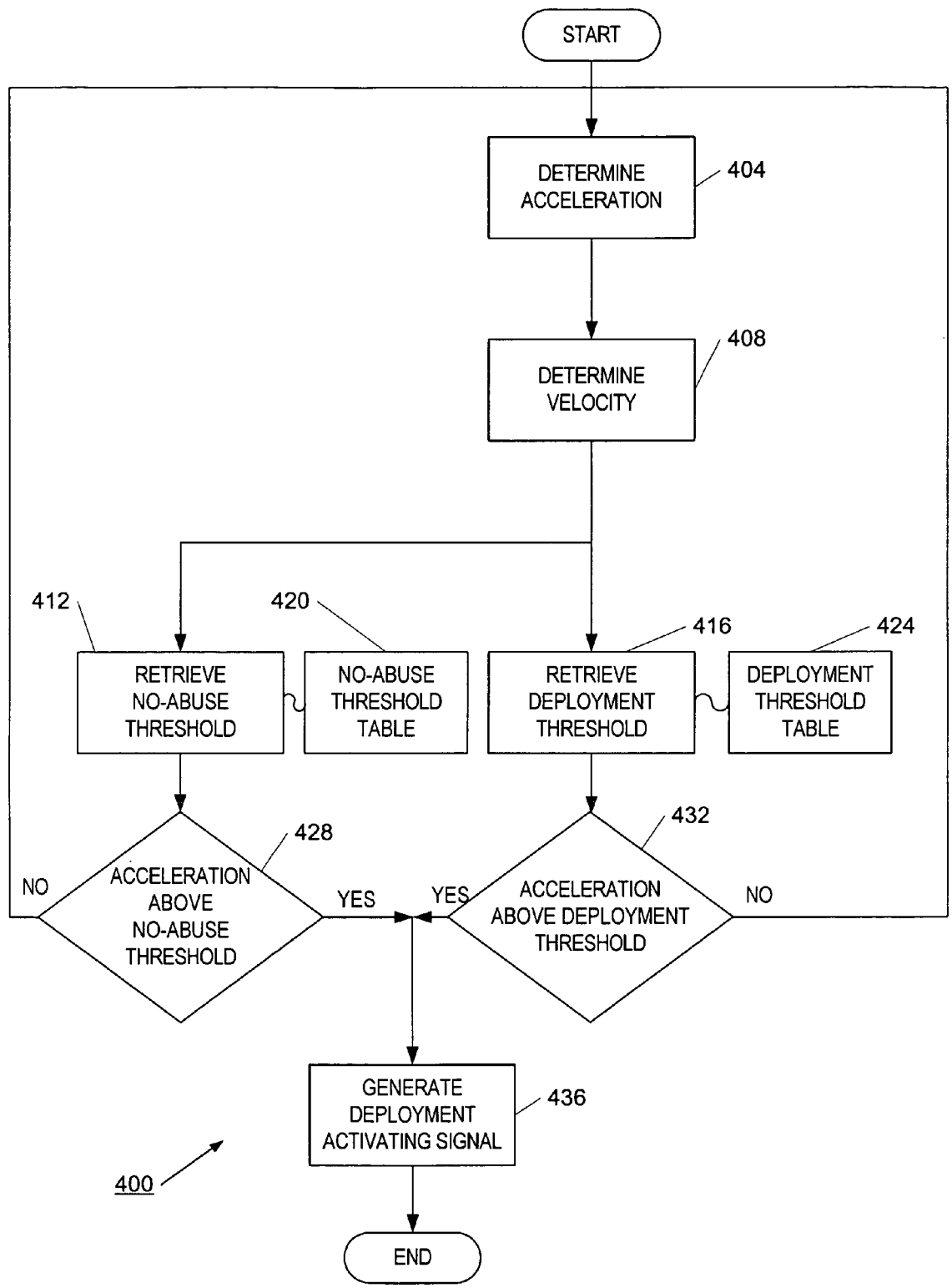
FIG. 4 is a flow chart of processing carried out in embodiments of the invention.

FIG. 4 includes a flow chart 400 that further illustrates processes that occur in some embodiments including process that maybe carried out by software, firmware, or hardware. As noted, the sensors sense accelerations and other parameters. This is shown at block 404. Analyzed values such as the relative velocity are determined from the unanalyzed values at block 408 using transformations such as integration in the case of velocity, double integration in the case of relative displacement, frequency filtering in the case of filtered acceleration, absolute valuing in the case of a power related value, and the like. The analyzed value is then used as a control value to retrieve the no-abuse threshold 312 at block 412, and the deployment threshold 362, as shown at block 416. The thresholds 312 and 362 are stored in the memory 204 as look-up-tables 420 and 424 respectively, in some embodiments. Once these thresholds 312 and 362 have been retrieved, the unanalyzed value is compared with the thresholds 312 and 362, as shown at blocks 428 and 432, respectively, and simultaneously depending on the applications at hand. When the unanalyzed value is above both thresholds 312 and 362, a deployment signal is generated as shown at block 436, which in turn activates the restraint device 208. However, if the unanalyzed value is below either one of the thresholds 312 and 362, the restraint device is disabled, and the block 404 is repeated.

Various features of the invention are set forth in the following claims.

What is claimed is:

1. A method of controlling a restraint device in a vehicle, the method comprising:
   determining, by a processor, a condition of the vehicle, the determined condition having a value;
   retrieving, from a memory, a no-abuse condition threshold based on the value of the determined condition;
   retrieving, from the memory, a deployment condition threshold based on the value of the determined condition; and
   generating, by a processor, a restraint device activation signal when the value of the determined condition is above the no-abuse condition threshold and the deployment condition threshold.

2. The method of claim 1, further comprising:
establishing, by the processor, the no-abuse condition threshold; and
independently establishing, by the processor, the deployment condition threshold.

3. The method of claim 1, wherein determining the condition of the vehicle further comprises:
sensing, by an acceleration sensor, an acceleration of the vehicle; and
determining, by the processor, a velocity of the vehicle from the acceleration.

4. The method of claim 1, further comprising transforming, by the processor, the condition into at least one of an acceleration, a velocity, a distance displacement of the vehicle, and a value indicative of energy dissipated in the vehicle.

5. The method of claim 1, wherein the value comprises an acceleration of the vehicle, the method further comprising integrating, by the processor, the acceleration of the determined condition.

6. The method of claim 1, further comprising generating, by the processor, a restraint device disable signal when the value of the determined condition is either below the no-abuse condition threshold or below the deployment condition threshold.

7. The method of claim 1, further comprising activating, by the processor, a restraint device if the restraint device activation signal is generated.

8. A method of controlling a restraint device in a vehicle, the method comprising:
sensing, by an acceleration sensor, an acceleration of the vehicle;
determining, by a processor, a vehicle signal based on the acceleration;
retrieving, from a memory, a no-abuse condition threshold based on the acceleration and the vehicle signal;
retrieving, from the memory, a deployment condition threshold based on the acceleration and the vehicle signal;
comparing, by the processor, a value of the vehicle signal with the no-abuse condition threshold and the deployment condition threshold; and
generating, by the processor, a deployment signal when the value of the determined vehicle signal is above the no-abuse condition threshold and the deployment condition threshold.

9. The method of claim 8, further comprising activating, by the processor, the restraint device.

10. The method of claim 8, further comprising integrating, by the processor, the sensed acceleration.

11. The method of claim 8, wherein the vehicle signal comprises at least one of a filtered acceleration of the vehicle, a velocity of the vehicle, a distance displacement of the vehicle, and a value indicative of energy dissipated in the vehicle.

12. The method of claim 8, further comprising:
establishing, by the processor, the no-abuse condition threshold; and
independently establishing, by the processor, the deployment condition threshold.

13. The method of claim 8, further comprising generating, by the processor, a disabling signal to the restraint device when the value of the determined vehicle signal is either below the no-abuse condition threshold or below the deployment condition threshold.

14. The method of claim 8, further comprising activating, by the processor, the restraint device if the deployment signal is generated.

15. An apparatus for controlling a restraint device in a vehicle, the apparatus comprising:
a sensor configured to sense a vehicle condition having a value indicative of a vehicle acceleration;
a comparator coupled to the sensor, and configured to compare the value indicative of the vehicle acceleration with at least two independent thresholds to produce a comparator output; and
a signal generator coupled to the comparator, and configured to create an activation signal based on the comparator output.

16. The apparatus of claim 15, further comprising a memory capable of storing the at least two independent thresholds.

17. The apparatus of claim 15, wherein the at least two independent thresholds comprise a no-abuse condition threshold and an independent deployment condition threshold.

18. The apparatus of claim 17, wherein the signal generator activates the restraint device when the value indicative of vehicle acceleration is above the no-abuse condition threshold and above the deployment condition threshold, and disables the restraint device when the value indicative of vehicle acceleration is either below the no-abuse condition threshold or below the deployment condition threshold.

19. The apparatus of claim 15, further comprising an analyzer configured to determine from the value at least one of an acceleration, a velocity, a distance displacement of the vehicle, and a value indicative of energy dissipated in the vehicle.

20. The apparatus of claim 15, wherein the analyzer comprises an integrator.

21. The apparatus of claim 15, wherein the sensor comprises an accelerometer.

22. The apparatus of claim 15, further comprising a processor coupled to the sensor, and configured to receive the value and to retrieve the at least two independent thresholds.

23. A vehicle comprising:
a sensor coupled to the vehicle, and configured to sense a vehicle condition having a value indicative of vehicle acceleration;
an electronic processing unit coupled to the sensor, having a comparator, the comparator comparing the value with a no-abuse condition threshold and an independent deployment condition threshold, the electronic processing unit generating a deployment signal when the value is above the no-abuse condition threshold and above the deployment condition threshold; and
a restraint device coupled to the electronic processing unit, and configured to be deployed upon receiving the deployment signal.

24. The vehicle of claim 23, wherein the electronic processing unit further comprises a memory capable of storing the no-abuse condition threshold and the independent deployment condition threshold.

25. The vehicle of claim 23, wherein the comparator generates a comparator output, and wherein the electronic processing unit disables the restraint device when the value indicative of vehicle acceleration is either below the no-abuse condition threshold or below the deployment condition threshold.

26. The apparatus of claim 23, wherein the electronic processing unit further comprises an analyzer configured to determine from the value indicative of vehicle acceleration at least one of a filtered acceleration, a velocity, a distance displacement of the vehicle, and a value indicative of energy dissipated in the vehicle.

* * * * *